(12) United States Patent
Fochler

(10) Patent No.: US 7,311,193 B2
(45) Date of Patent: Dec. 25, 2007

(54) BOX-CONVEYOR CHAIN

(75) Inventor: Fritz Fochler, Illerkirchberg (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 50 days.

(21) Appl. No.: 11/406,517

(22) Filed: Apr. 18, 2006

(65) Prior Publication Data

US 2006/0237287 A1 Oct. 26, 2006

(30) Foreign Application Priority Data

Apr. 20, 2005 (DE) .................. 10 2005 018 394

(51) Int. Cl.
*B65G 29/00* (2006.01)
(52) U.S. Cl. .................. 198/867.11; 198/867.01; 198/803.14; 198/837
(58) Field of Classification Search ............... 198/707, 198/708, 712, 837, 793, 797, 465.1, 469.1, 198/473.1, 867.01, 867.1, 867.11, 867.12, 198/867.15, 803.14, 803.15, 803.16, 803.3, 198/850–853
See application file for complete search history.

(56) References Cited

U.S. PATENT DOCUMENTS

| | | | | |
|---|---|---|---|---|
| 5,337,887 A * | 8/1994 | Greenwell et al. | ..... | 198/867.14 |
| 5,464,090 A * | 11/1995 | Lucas | ..... | 198/867.11 |
| 5,911,303 A * | 6/1999 | Malanowski | ..... | 198/731 |
| 6,074,723 A * | 6/2000 | Gennari et al. | ..... | 428/119 |
| 6,142,290 A * | 11/2000 | Tagliaferri | ..... | 198/716 |
| 6,209,716 B1 * | 4/2001 | Bogle et al. | ..... | 198/852 |
| 6,213,461 B1 * | 4/2001 | Ratz et al. | ..... | 271/187 |
| 6,367,612 B1 * | 4/2002 | Dosso et al. | ..... | 198/465.4 |
| 6,382,401 B2 * | 5/2002 | Takemoto et al. | ..... | 198/803.11 |
| 6,435,335 B2 * | 8/2002 | Cassoni et al. | ..... | 198/465.1 |
| 6,598,732 B2 * | 7/2003 | Guindulain Vidondo | ..... | 198/728 |
| 6,662,932 B1 * | 12/2003 | O'Neill | ..... | 198/730 |
| 6,662,933 B2 * | 12/2003 | De Guglielmo et al. | ..... | 198/732 |
| 6,786,326 B2 * | 9/2004 | Hiramoto et al. | ..... | 198/817 |
| 7,090,070 B2 * | 8/2006 | Linder | ..... | 198/841 |
| 7,182,202 B2 * | 2/2007 | Kalverkamp | ..... | 198/844.1 |

* cited by examiner

*Primary Examiner*—Gene O. Crawford
*Assistant Examiner*—Rashmi Sharma
(74) *Attorney, Agent, or Firm*—Andrew Wilford

(57) ABSTRACT

A conveyor chain has a succession of longitudinally succeeding links, a respective entrainment lug projecting transversely outward from each link and formed with a latch seat and a plurality of identical entrainment elements. The entrainment elements each have a transversely outwardly projecting entrainment arm, a transversely inwardly open socket adapted to fit complementarily over a respective one of the lugs, a formation in the socket engageable in the seat of the respective one lug, and a longitudinally extending brace bearing transversely inward on at least one of the lugs adjacent the respective one lug.

7 Claims, 1 Drawing Sheet

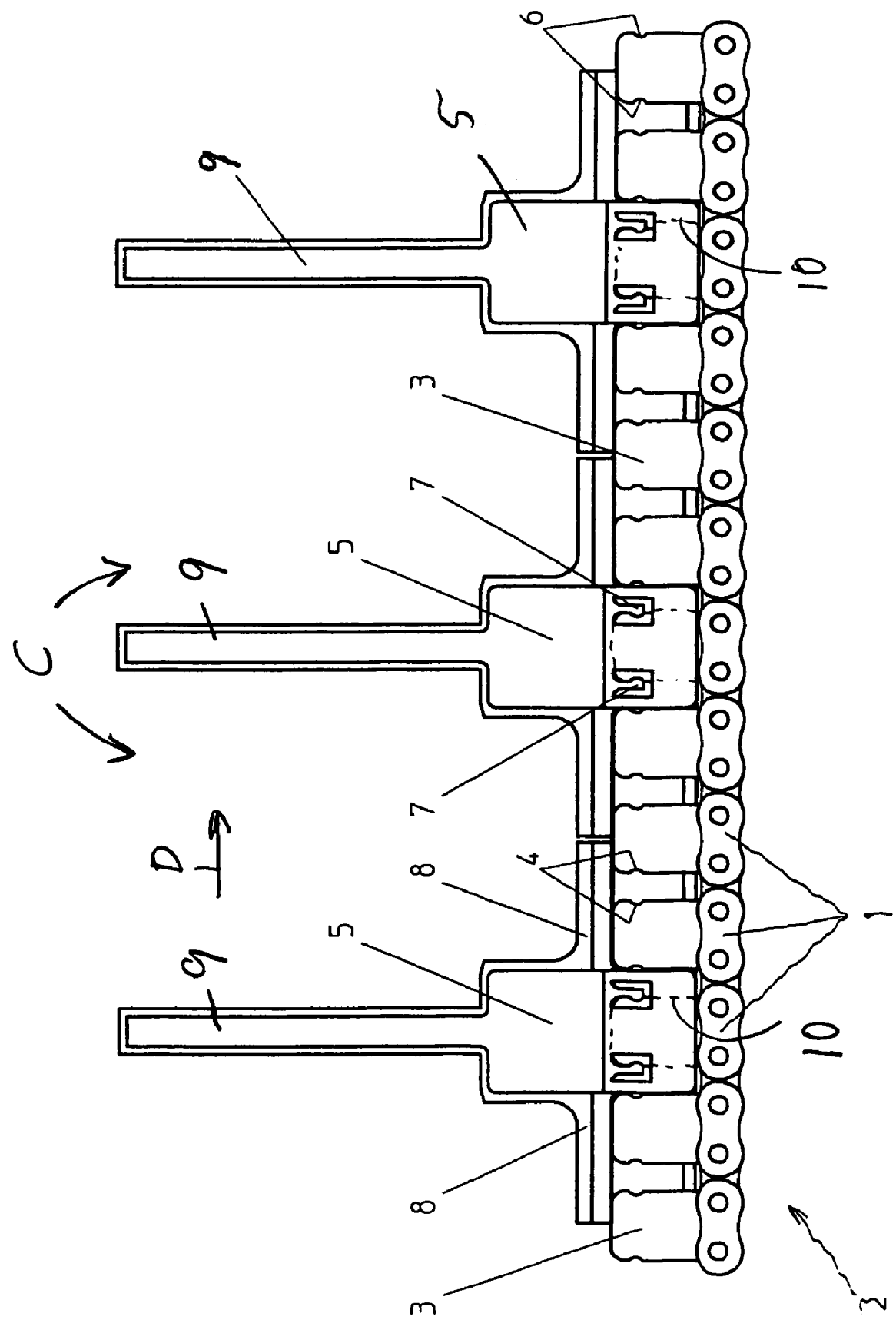

BOX-CONVEYOR CHAIN

FIELD OF THE INVENTION

The present invention relates to a conveyor. More particularly this invention concerns a conveyor chain intended for horizontally displacing boxes.

BACKGROUND OF THE INVENTION

A typical conveyor chain intended for transporting boxes, for instance in a packaging operation, has a plurality of links fitted out to form upwardly open cells in which the boxes fit. A succession of entrainment elements fixed to the chain links form the cells. Normally the chain is endless and is passed over upstream and downstream driver wheels or drums to continuously advance the boxes.

In conveyor chains which have been used in such conveyors until the present day, a special adaptation of the spacing is necessary. In other words the entrainment elements have to be specially positioned to fit with the dimensions of the folding boxes which have to be transported, to which end the conveyor chain are riveted to straight lug link plates. This can only be done manually and accordingly increases the cost of manufacture of the conveyor chain. Furthermore, in known conveyor chains, a disadvantage consists in the fact that the support of the entrainment elements is insufficient, so that the entrainment element can move at its upper ends in the top conveying reach of the chain.

OBJECTS OF THE INVENTION

It is therefore an object of the present invention to provide an improved box-conveyor chain.

Another object is the provision of such an improved box-conveyor chain that overcomes the above-given disadvantages, in particular that can readily be adapted to boxes of different sizes and that is inexpensive to manufacture and refit.

SUMMARY OF THE INVENTION

This object is achieved according to the invention in a conveyor of the above-described type cited wherein each chain link has an entrainment lug which extends outward and an entrainment element has latch seat for connection with the entrainment lug and having a brace for support on one of the adjacent entrainment lugs.

This design has the advantage that the conveyor chain can be a mass-produced standard item, since every chain link has an entrainment lug that itself is designed in the same manner. Thus an entrainment element can be positioned optionally via the latch seat onto the respective entrainment lug. Thus, a spacing neutral conveyor chain is on hand, in which only at the moment of attaching the entrainment elements on the entrainment lug the spacing is determined. Since the entrainment element has a brace, its base is broadened, so that the entrainment element is exposed to minor vibrations.

It is further provided within the scope of the invention that the entrainment lug has on its external perimeter surface at least one recess for the latch seat for interaction with at least one latch tab which has to the entrainment element. This design distinguishes itself by the fact that the interaction of the entrainment element with the entrainment lug can be effected in a very simple manner by means of a plug-in connection, wherein the attachment between the entrainment element and the entrainment lug is assured via the latch seat even when the revolving conveyor chain on its lower run orients the entrainment element such that they point downwards. As a result the possibility exists that the recess is enlarged as an annular all-around groove and there are several latch tabs to increase the carrying capacity of the connection between the entrainment element and the entrainment lug.

In respect of the stabilization of the connection between the entrainment element and the entrainment lug, it is furthermore provided that the side walls of the entrainment lug are designed as guiding surfaces fitting into the entrainment element.

For a further broadening of the base for the support of the entrainment element, there are two such braces, one pointing forward and one backward in the conveyor-travel direction. For the same purpose serves the fact that the brace is supported on several of the adjacent entrainment lugs. Therein, the design can be such that the space between two entrainment elements is covered by at least one brace, so that in the result, the width of the entrainment element on its base is adjusted to the desired machine spacing.

BRIEF DESCRIPTION OF THE DRAWING

The above and other objects, features, and advantages will become more readily apparent from the following description, reference being made to the accompanying drawing whose sole FIGURE is a partly schematic side view illustrating the present invention.

SPECIFIC DESCRIPTION

As seen in the drawing a box conveyor has a conveyor chain 2 formed by individual chain links 1 and moving continuously in the illustrated upper stretch in a horizontal transport direction D. Unillustrated drums or wheels at upstream and downstream ends of the chain 2 hold both the illustrated upper stretch and an unillustrated lower stretch taut and horizontal.

According to the invention each chain link 1 has an entrainment lug 3 that projects laterally, upward in the illustrated upper stretch. Each entrainment lug 3 has a latch seat 4, for connection a respective entrainment element 5. Each latch seat 4 on the external perimeter surface of the entrainment lug 3 being formed by two opposite sides two recesses 6 for interaction with two latch tabs 7 formed on the entrainment element 5.

Furthermore, each entrainment element 5 has a pair of braces 8 for support on adjacent entrainment lugs 3, one projecting forward and one rearward in the conveyor-travel direction D. In the illustrated embodiment every fourth lug 3 is provided with an element 5 so that each brace bears on one and one-half adjacent lugs 3. The result is exceptional stability.

The entrainment element 5 has a downwardly open socket 10 by means of which it is plugged onto the respective entrainment lug 3. Side walls of the entrainment lug 3 define this socket 10.

The entrainment elements 5 furthermore each have an outwardly projecting arm 9, which in the illustrated upper reach extend vertically and define upwardly open cells C in which boxes or the like can be held. Due to the solid mounting of the elements 5, the arms 9 are not readily deflectable and firmly hold whatever is in the cells C.

Such a conveyor chain 2 designed with entrainment lugs 3 and entrainment elements 5 offers furthermore the advantage that manufacture costs for conveyors, as identical components for different spacings can be used and a fast adaptation to altered customer requirements is possible.

I claim:

1. A conveyor chain comprising:
    a succession of longitudinally succeeding links;
    a respective entrainment lug projecting transversely outward from each link and formed with a latch seat;
    a plurality of identical entrainment elements each formed with
        a transversely outwardly projecting entrainment arm,
        a transversely inwardly open socket adapted to fit complementarily over a respective one of the lugs,
        a formation in the socket engageable in the seat of the respective one lug, and
        a longitudinally extending brace bearing transversely inward on at least one of the lugs adjacent the respective one lug.

2. The conveyor chain defined in claim 1 wherein the latch seat is a recess and the formation is a latch tab.

3. The conveyor chain defined in claim 2 wherein the recess is an annular groove, each socket having a plurality of the tabs engaged in the respective groove.

4. The conveyor chain defined in claim 1 wherein side walls of the element form the socket.

5. The conveyor chain defined in claim 1 wherein each element has two such braces extending longitudinally oppositely.

6. The conveyor chain defined in claim 1 wherein the brace extends longitudinally past and engages more than one adjacent lug.

7. The conveyor chain defined in claim 1 wherein the braces cover the chain between the elements.

* * * * *